US012664896B2

(12) United States Patent
Haupt et al.

(10) Patent No.: US 12,664,896 B2
(45) Date of Patent: Jun. 23, 2026

(54) CONTROL DEVICE FOR LONGITUDINAL AND/OR TRANSVERSE GUIDANCE IN A VEHICLE GROUP

(71) Applicant: MAN Truck & Bus SE, Munich (DE)

(72) Inventors: Christian Haupt, Munich (DE); Julius Engasser, Munich (DE); Alexander Buß, Munich (DE)

(73) Assignee: MAN Truck & Bus SE, Munich (DE)

( * ) Notice: Subject to any disclaimer, the term of this patent is extended or adjusted under 35 U.S.C. 154(b) by 487 days.

(21) Appl. No.: 18/035,120

(22) PCT Filed: Oct. 12, 2021

(86) PCT No.: PCT/EP2021/078107

§ 371 (c)(1),
(2) Date: May 3, 2023

(87) PCT Pub. No.: WO2022/096234

PCT Pub. Date: May 12, 2022

(65) Prior Publication Data

US 2024/0012422 A1 Jan. 11, 2024

(30) Foreign Application Priority Data

Nov. 6, 2020 (DE) .................... 10 2020 129 291.0

(51) Int. Cl.
*G08G 1/00* (2006.01)

(52) U.S. Cl.
CPC .................................... *G08G 1/22* (2013.01)

(58) Field of Classification Search
CPC ................................ G08G 1/22; Y02T 10/82
(Continued)

(56) References Cited

U.S. PATENT DOCUMENTS

2006/0247839 A1* 11/2006 Logdberg ............... B62D 35/00 701/96
2010/0332052 A1* 12/2010 Ratliff .................... G05D 1/101 701/3

(Continued)

FOREIGN PATENT DOCUMENTS

DE 102018212527 A1 1/2020
DE 102018220293 A1 5/2020

(Continued)

OTHER PUBLICATIONS

German Search Report issued in German Patent Application No. 102020129291.0 dated Jul. 27, 2021. English translation not available.

*Primary Examiner* — Andrew R Dyer
(74) *Attorney, Agent, or Firm* — Weber Rosselli & Cannon LLP

(57) ABSTRACT

A description is given of a control device (100) for the longitudinal and/or transverse guidance of a vehicle (102), in particular a utility vehicle, in relation to at least one further vehicle (104) in a vehicle group (106). The control device (100) comprises a determination unit (108) for determining a vehicle air resistance, FL, and a further vehicle air resistance, wFL. The control device (100) furthermore comprises a control unit (110) for controlling a control variable in the vehicle group (106). The control device (100) furthermore comprises a storage unit (112) for storing the determined FL and wFL in association with the controlled control variable in a characteristic diagram. The control unit (110) varies the control variable. A computing unit (114) of the control device (100) calculates an optimizing control variable. The control unit (110) furthermore controls the control variable in accordance with the optimized control variable.

17 Claims, 3 Drawing Sheets

(58) Field of Classification Search
USPC .............................................................. 701/49
See application file for complete search history.

(56) References Cited

U.S. PATENT DOCUMENTS

| | | | | |
|---|---|---|---|---|
| 2013/0080018 | A1 | 3/2013 | Baek | |
| 2013/0173121 | A1 * | 7/2013 | Tenstam | B60K 11/085 701/49 |
| 2018/0366005 | A1 | 12/2018 | Seenumani et al. | |
| 2020/0139945 | A1 * | 5/2020 | Schoenly | B61C 17/12 |
| 2023/0286598 | A1 * | 9/2023 | Beller | B62D 35/002 |

FOREIGN PATENT DOCUMENTS

| | | | | |
|---|---|---|---|---|
| DE | 102018130968 | A1 | | 6/2020 |
| JP | 2019093945 | A | * | 6/2019 |
| WO | 2018111177 | A1 | | 6/2018 |
| WO | 2019068397 | A1 | | 4/2019 |

* cited by examiner

CONTROL DEVICE FOR LONGITUDINAL AND/OR TRANSVERSE GUIDANCE IN A VEHICLE GROUP

CROSS-REFERENCE TO RELATED APPLICATIONS

This application is a 371 application of PCT/EP2021/078107 filed Oct. 12, 2021 which claims benefit of and priority to German Patent Application Serial No. DE102020129291.0 filed Nov. 6, 2020, the disclosures of the above-identified applications are hereby incorporated by reference in their entirety.

The invention relates to a control apparatus for the longitudinal and/or lateral guidance of a vehicle, in particular of a utility vehicle, relative to at least one further vehicle in a vehicle group.

Document WO 2018/111177 A1 describes a control unit for setting a vehicle distance between vehicles in a vehicle group, which may also be referred to as a platoon. The control unit is configured to acquire a geographic position for a vehicle in the platoon, to determine a zone in which the acquired geographic position is located, to determine a minimum distance limit between the vehicles that is assigned to the determined zone, and to set the distance between the vehicles in the platoon in accordance with the determined minimum distance limit by transmitting a control signal to the vehicle in the platoon.

Document WO 2019/068397 A1 describes a method for arranging vehicles, in particular utility vehicles, in a platoon. Target longitudinal offsets and/or target lateral offsets between the individual vehicles are ascertained. To this end, at least one wind action parameter indicating how wind prevailing in a vehicle environment acts on at least one of the vehicles in the platoon is ascertained. The target lateral offset and/or the target longitudinal offset for the respective vehicle in the platoon are defined in dependence on the wind action parameter such that the air resistance acting at least on one of the vehicles in the platoon reduces under the prevailing wind. The position of each vehicle in the platoon is preferably also determined on the basis of aerodynamic properties of the respective vehicle. Here, it is not only the vehicle height, the vehicle length, and the vehicle width, but also the vehicle geometry within the external dimensions, such as front-side or rear-side air guidance systems, in particular spoilers, the geometry of the vehicle body, and also the type of the vehicle body that are relevant, because, for example, with the same vehicle geometry, a body consisting of tarpaulin and mirror differs aerodynamically from a box body.

In other words, it is known that in vehicles within a vehicle group (i.e., platoon), reducing the air resistance of the individual vehicles can lead to fuel savings. It is also known that the air resistance of the individual vehicles within the column changes depending on their distances from one another. In order to be able to set energetically optimal vehicle distances within the column, the exact knowledge of the connection between the air resistances of the vehicles and the vehicle distances is of central importance. Energy-efficient and automated controls for column-driving according to the prior art proceed from a fixed connection, typically determined through simulation, between air resistances and vehicle distances.

However, these conventional systems do not take into consideration the actual air resistances of the vehicles involved in the vehicle group. The actual air resistances may not just be individual for the vehicles involved. The actual air resistances can be specific for the respective journey of the vehicles involved and/or change during the journey depending on properties of the vehicles involved, for example depending on a variable body or an external geometry and/or external surface area that is dependent on the cargo.

Furthermore, the actual connection between the air resistances of the vehicles and the vehicle distances can be more complex, however, and cannot be assumed to be invariable during column-driving owing to varying conditions. That means that the energy efficiency of column-driving can be increased further with better knowledge of the distance-dependent air resistances.

The invention is based on the object of carrying out the operation of a vehicle group with at least two vehicles with better energy efficiency, wherein the intention is to preferably minimize the energy consumption of the entire vehicle group. An alternative or more specific object is to base the energy-efficient operation of a vehicle group on the actual air resistances during the journey. An alternative or more specific object is to take into account during the energy-efficient operation of a vehicle group influences on the air resistances that are specific to the journey or that vary during the journey, wherein it is preferably properties of the vehicles involved that cause the influences. A further or alternative object is the determination of the connection between the current air resistances of the vehicles in a vehicle group and the vehicle distances within the vehicle group during the journey and of the setting of the energetically optimal vehicle distances between the vehicles in the vehicle group.

Said object or objects is/are achieved by way of an apparatus having the features of the independent claim. Advantageous embodiments and uses of the invention will emerge from the dependent claims and will be discussed in more detail in the following description, occasionally with reference to the figures.

According to one aspect, a control apparatus for the longitudinal and/or lateral guidance of a vehicle, in particular of a utility vehicle, relative to at least one further vehicle in a vehicle group is provided. The control apparatus comprises a determination unit, which is configured to determine a vehicle air resistance, FL, of the vehicle and a further vehicle air resistance, wFL, of the at least one further vehicle. The control apparatus furthermore comprises a control unit, which is configured to control a control variable of the longitudinal and/or lateral guidance of the vehicle and/or of the at least one further vehicle in the vehicle group. The control apparatus furthermore comprises a memory unit, which is configured to store the determined FL and wFL in association with the controlled control variable in a characteristic map.

According to a further aspect, which may be combined with the preceding aspect, the control unit is configured to vary the control variable, the determination unit is configured to determine the FL and the wFL in the state of the varied control variable, and the memory unit is configured to store the FL and wFL determined in the state of the varied control variable in the characteristic map in association with the varied control variable.

According to a further aspect, which may be combined with the preceding aspects, the control apparatus furthermore comprises a computational unit, which is configured to calculate a control variable optimizing the FL and the wFL on the basis of the stored characteristic map.

According to a further aspect, which may be combined with the preceding aspects, the control unit is furthermore configured to control the control variable of the longitudinal and/or lateral guidance of the vehicle and/or of the at least one further vehicle in the vehicle group in accordance with the optimized control variable.

The control apparatus can be implemented in the form of an apparatus for the energy-efficient control of a vehicle group.

The control apparatus can be configured in each case for electronic data processing and be determined in terms of its function by means of, among other things, the following units, wherein the control apparatus can have further units, so that the function can be adapted to the task of the control apparatus. For example, the control apparatus can be a computer or a microcomputer which is in the form of a digital computer or a hybrid computer, wherein the size of the control apparatus can be determined by the installation location to be utilized.

The control apparatus can be implemented in the vehicle and/or in the, or one of the at least one, further vehicle(s).

The vehicle or the at least one further vehicle can be a motor vehicle that is driven by an engine and is configured for moving on a roadway, for example on a road. In a specific embodiment, the vehicle or the at least one further vehicle can be a utility vehicle, an omnibus, a passenger car, a forklift, or an agricultural machine.

The vehicle group can comprise the vehicle and the at least one further vehicle. The vehicle group possibly comprises only utility vehicles, for example only trucks and/or semitrailers, as vehicles. As an alternative or in addition, the vehicle group can be heterogeneous. For example, the vehicle and the at least one further vehicle can differ in terms of their respective external geometries. The external geometry of the vehicle and of the at least one further vehicle can be specific to the journey, for example depend on a cargo of the respective vehicle.

One of the vehicles in the vehicle group (for example the vehicle or the at least one further vehicle) can be configured to be a lead vehicle controlling the vehicle group. The lead vehicle can here also be a vehicle following the vehicle group (trailing vehicle), or the task of being the lead vehicle can be transferred to a vehicle following the vehicle group.

The vehicle group can be, for example, a platoon and/or a column which describes the movement of vehicles with one another and/or relative to one another. The vehicle group (preferably the controlling vehicle) can here impose stipulations relating to the vehicle behavior (preferably the longitudinal and/or lateral guidance) on the vehicles, for example distances between the vehicles to be observed and/or speeds.

The vehicle air resistance (FL) can be understood to mean, for example, the flow resistance of the vehicle and/or describe the force acting on the vehicle opposing the movement of the vehicle. The vehicle air resistance can here negatively influence the operation of the vehicle to the effect that the operation requires increased energy consumption compared to what would be necessary for kinetic operation. The same may apply to the further vehicle air resistance (wFL) of the at least one further vehicle.

The determination unit can be configured to determine data relating to the vehicle air resistance. For this purpose, different influences of the vehicle air resistance on the vehicle can be determined and calculated by means of an equation, for example a conditional equation, for the vehicle air resistance.

The control variable can be derived from the data of the vehicle air resistance. Alternatively or additionally, the control variable or one of the control variables may be configured for controlling the vehicle in its relative movement to the at least one further vehicle. The control variable can here include different parameters which depend on the operation or operating state of the vehicle and of the at least one further vehicle in the vehicle group.

The control unit can use the control variable to arrange the vehicle and the at least one further vehicle relative to one another, wherein the control variable can be used for continuously arranging the vehicle in the vehicle group relative to the at least one vehicle. During the operation of the vehicle group, the control unit can vary the control variable in each case, wherein the control variable is varied on the basis of the FL and/or the wFL.

The characteristic map can be implemented by means of a map memory structure, for example an array, a vector or a matrix, a polynomial function or interpolation, preferably a linear regression, wherein the characteristic map may be configured at least for storing purposes or carries out functional associations during or after the storing operation, wherein the memory unit can in each case store the characteristic map and/or carry out the associations.

When the vehicle group is set up, the characteristic map can be initialized by values for the FL and the wFL that are measured in the respective vehicle during the journey outside the vehicle group or are stored.

The computational unit can be an electronic data processing means of the control apparatus, for example. The computational unit can be a dedicated electronic data processing means for calculating the characteristic map in the control apparatus.

The optimizing control variable can be understood to be a more optimal control variable for lowering the FL and/or the wFL, wherein it can be used by the control unit for controlling the vehicle.

The control apparatus can be configured, by means of the determination unit, the control unit, the memory unit, and the computational unit, for controlling the operation of the vehicle and the at least one further vehicle within a vehicle group. When the vehicle group is set up (that is, when it is first configured), it can be arranged relative to one another by means of stipulated control variables. The stipulated control variables can be ascertained and/or calculated on the basis of a prior operation of the vehicle group or of another vehicle group.

The memory unit can adapt (for example supplement or update) the characteristic map on the basis of the determined FL and wFL during the operation of the vehicle group. The characteristic map can indicate the actual FL and wFL (that is, the FL and wFL previously determined during the variation) in relation to the set control variable (that is, the control variable resulting from the variation). The computational unit calculates an optimized control variable with the aid of the relation of the characteristic map and optionally the set control variable (that is, the last control variable resulting from the variation). For example, a local optimum of the FL and wFL, which, starting from the set control variable (that is, the last control variable resulting from the variation), is the next local optimum, can be calculated. This can simplify a vehicle maneuver during the control in accordance with the optimized control variable.

By arranging the vehicle group on the basis of the optimized control variable, a minimal total air resistance, which is formed from the FL and the wFL, of the vehicle group can be achieved. This minimal total air resistance is achieved by adapting the optimized control variable, formed by means of the characteristic map and optionally the set control variable, by means of the computational unit. Optionally, the characteristic map is here continuously adapted by means of the determined FL and/or wFL, so that the vehicle group can be adapted regularly to changed influences (for example vehicle-own or environmental influences). Owing to the regular adaptations, it is possible to ensure that the vehicle group is operated in an energy-efficient manner.

Exemplary embodiments of the control apparatus can achieve the underlying object of energy-efficient operation of a vehicle group for example by utilizing the regular determination of the FL and of the wFL and of the associated control variable and/or the regular calculation of the optimized control variable for the energy-efficient operation of the vehicle group. The regularly updated characteristic map and/or the regularly calculated optimized control variable can enable the control unit to minimize the FL and wFL during operation and lead to an energy-efficient operation of the vehicle group.

The determination unit can measure the FL and/or the wFL or calculate it/them on the basis of data from at least one sensor of the vehicle and/or of the at least one further vehicle.

The sensor can be, for example, a sensor present in the vehicle, for example an acceleration sensor and/or a sensor for ascertaining the consumption of the vehicle during operation. For example, the sensor can be added to the vehicle for operating the control apparatus so that proper operation within the vehicle group can be ensured.

The determination unit can be configured to determine the FL and/or the wFL and determine them by means of data from different sources. These data can comprise in each case the measurement of the FL and/or of the wFL and/or the collection of data from sensors of the vehicle, wherein the measured and/or collected data can be used to ascertain the FL and/or the wFL.

The control variable (or the optimized control variable) can comprise at least a longitudinal distance of the vehicle and/or of the at least one further vehicle in relation to one another and/or a lateral offset of the vehicle and/or of the at least one further vehicle in relation to one another. For example, the control variable (or the optimized control variable) can comprise a set or vector with target values for each vehicle in the vehicle group. The control variable can furthermore comprise a driving speed of the vehicle and/or of the at least one further vehicle and/or of the vehicle group. Alternatively or additionally, the control variable can comprise a driving level and/or a setting (or orientation) of an aerodynamic element (for example an air-guidance surface on the outer skin, preferably a roof of the driver's cab) of the vehicle and/or of the at least one further vehicle.

Alternatively or additionally, the control variable can comprise a longitudinal distance of the or each further vehicle relative to the vehicle.

Alternatively or additionally, the control variable can comprise a lateral offset of the vehicle relative to the or each further vehicle. Alternatively or additionally, the control variable can comprise a lateral offset of the or each further vehicle relative to the vehicle.

The lateral offset can be a relative lateral offset between the vehicle and the at least one further vehicle. Alternatively or additionally, the lateral offset can be a lateral offset of the vehicle and/or of the at least one further vehicle relative to a roadway, for example the roadway marking.

The longitudinal offset can be a distance between the vehicle and the at least one further vehicle. For example, the longitudinal distance can be a longitudinal offset minus a vehicle length.

The at least one further vehicle can comprise a further vehicle driving (preferably immediately) ahead of the vehicle in the vehicle group and/or a further vehicle driving (preferably immediately) behind the vehicle in the vehicle group.

The driving speed (for example a movement speed relative to the road) can comprise a speed of the locomotion of the vehicle and/or of the at least one further vehicle and/or of the vehicle group along the roadway. For example, the driving speed can indicate the distance per unit time that has been traveled in each case, preferably in kilometers per hour.

The driving level can comprise for example the distance of a vehicle body of the vehicle and/or of the at least one further vehicle relative to the roadway and/or an adaptation of a wheel and/or a plurality of wheels of the vehicle and/or of the at least one further vehicle to a characteristic (preferably unevenness) of the roadway.

The aerodynamic element can influence, for example, the air resistance of the vehicle and/or of the at least one further vehicle and/or the flow (or flow characteristic) around the vehicle and/or the at least one further vehicle. The aerodynamic element can comprise here for example a spoiler or a superstructure or body of the vehicle and/or of the at least one further vehicle. The aerodynamic element can be configurable (for example be controllable in terms of its orientation), preferably during a movement or operation of the vehicle and/or of the at least one further vehicle.

The control variable can be used for controlling the vehicle and/or the at least one further vehicle in an open or closed loop. For example, an arrangement and/or speed of the vehicle and/or of the at least one further vehicle relative to one another can be controlled in an open or closed loop and/or an arrangement and/or speed of the vehicle and/or of the at least one further vehicle can in each case be controlled in an open or closed loop. The control of the control variable can be influenced here and indicate the extent of the control (for example a deviation between the target value and the actual value of the control variable).

The memory unit can furthermore be configured to calculate before the storing operation a deviation between the determined FL and wFL and the FL and wFL stored in the characteristic map in association with the varied control variable. The control unit can be configured to calculate the optimized control variable if (for example only if or only when) the deviation is less than a threshold value.

The deviation (for example during the storing in association with many different values for the control variable) can be a measure of the accuracy of the already stored characteristic map. The threshold value can be a limit value for exceeding and/or falling below the absolute value of the deviation. Accordingly, exceeding and/or falling below can result in a reaction of the system, for example of the memory unit and/or of the control apparatus.

If the deviation falls below the threshold value, the characteristic map can be sufficiently accurate for calculating the optimized control variable. The memory unit optionally calculates a plurality of deviations between the determined FL and wFL and the FL and wFL stored in the characteristic map, which are stored in association with control variables that neighbor the control variable resulting from the variation.

The memory unit can furthermore be configured to calculate before the storing operation a deviation between the determined FL and wFL and the FL and wFL stored in the characteristic map in association with the varied control variable. The control unit can be configured to continue the variation of the control variable if (for example only if or only when) the deviation is greater than or equal to a threshold value, for example greater than or equal to the previously mentioned threshold value.

The control apparatus can furthermore comprise a communication device, which is configured to transmit the control variable and/or the optimized control variable to the further vehicle in the vehicle group and/or to receive the wFL from the further vehicle in the vehicle group. Optionally, the control apparatus is implemented in the vehicle in the vehicle group. Alternatively or additionally, the communication device is configured to transmit the control variable and/or the optimized control variable from a data processing apparatus outside the vehicle group to the vehicle and the further vehicle in the vehicle group and/or to receive the FL from the vehicle and the wFL from the further vehicle in the vehicle group. Optionally, the control apparatus is implemented in the data processing apparatus outside the vehicle group.

The communication device and/or the data communication device can be configured to transmit information, wherein the transmitted information is preferably digital data. The communication device can transmit the data here, among other things, via a cable-bound or a wireless transmission interface.

The data processing apparatus can be configured to process and/or edit digital data, wherein it may be for example a computer or a microcomputer configured as a digital computer or a hybrid computer.

The communication device can enable the vehicles in the vehicle group to be controlled or remote-controlled by in each case a vehicle in the vehicle group and/or by the data processing apparatus. In this case, a respective vehicle can communicate with the other vehicles, or a vehicle can communicate for all vehicles with the data processing apparatus, or all vehicles can communicate with the data processing apparatus.

The optimized control variable calculated by the computational unit can be configured to orient the vehicle by means of the longitudinal and/or lateral guidance relative to the at least one further vehicle such that an average formed from the FL and the wFL is minimal or reduced.

The average can be weighted. For example, a weight of the weighted average can depend on a drive power or an efficiency of a drive of the respective vehicle.

The average can be an arithmetic mean formed at least from the FL and the wFL. Alternatively or additionally, the optimized control variable can minimize or reduce a sum of the FL and the at least one wFL.

The computational unit can be configured to determine a total air resistance of the vehicle group. The computational unit can calculate the optimized control variable for reducing or minimizing the total air resistance. Controlling all the vehicles in the vehicle group according to the optimized control variable can optimize the energy efficiency of the entire vehicle group.

The memory unit can comprise a neural network representing the characteristic map. The computational unit can be configured to calculate the control variable optimizing the FL and the wFL by means of the neural network.

The neural network can be, for example, an artificial neural network that assists in or carries out the calculation of the optimized control variable. For example, the computational unit can be configured to train the neural network to calculate the optimized control variable. The computational unit can be configured to train the neural network when using (for example when varying the control variable of) the vehicle group to calculate the optimized control variable.

The control apparatus can be arranged outside of the vehicle and/or of the at least one further vehicle. The control apparatus can furthermore comprise a data communication device, which is configured to receive data for determining the FL and the wFL, by means of which data the determination unit determines the FL and the wFL. The control unit can transmit the control variable by means of the data communication device for the longitudinal and/or lateral guidance of the vehicle and/or of the at least one further vehicle in the vehicle group to the vehicle and/or the at least one further vehicle.

A control apparatus arranged outside of the vehicle can be configured, for example, for centrally controlling one or more vehicle groups, wherein each vehicle in the one or more vehicle groups can be controlled. The at least one control variable in each case can be transmitted for example between the control apparatus and the respective vehicle.

The computational unit can be implemented in a computational network or cloud server.

The computational network can include, for example, one or more computers, which can be in the form of servers, among other things. The respective server can have an interface for communicating with the vehicle or the further vehicle in the vehicle group. For example, the computational network can comprise one or more cloud servers.

The computational network can assist the control apparatus for example in the calculation of the optimized control variable and the adaptation of the characteristic map. The computational network can furthermore enable and/or promote the inclusion of further influencing variables on the operation of the vehicle group. In this case, the further influencing variables can be, for example, weather data and/or geographic data of the roadway, among other things.

The computational unit can calculate the optimized control variable on the basis of the FL and of the wFL to minimize a drive power of the vehicle and of the at least one further vehicle.

The optimization of the drive power can be used, for example, for increasing the energy efficiency of the vehicle group, wherein a drive power for the vehicle and the at least one further vehicle that is as optimal as possible is determinable by means of reducing the FL and/or the wFL.

The control unit can be configured to control the control variable of the longitudinal and/or lateral guidance of the vehicle and/or of the at least one further vehicle in the vehicle group in a closed loop. The control variable can be a closed-loop control variable.

The control unit can be configured to orient the vehicle and/or the at least one further vehicle in relation to one another with closed-loop control, wherein the closed-loop control variable is used continuously or regularly for orientation purposes and any disturbances can in this way be compensated for.

The control apparatus can be arranged in the vehicle and/or in at least one further vehicle and be configured to control a plurality of vehicles or all the vehicles in the vehicle group in an open loop and/or closed loop. The one vehicle can be configured, for example, for controlling the longitudinal and/or lateral guidance of the at least one further vehicle by means of the control apparatus.

The memory unit can be configured to store the FL and wFL determined in the state of the varied control variable in the characteristic map in association with the varied control variable and at least one parameter. The parameter can influence the FL and/or the wFL, without being controlled by the control unit. For example, the parameter can comprise a wind speed and/or a vehicle geometry.

According to a further aspect, a vehicle, in particular a utility vehicle, is provided, which is configured for the longitudinal and/or lateral guidance in a vehicle group with two or more vehicles. The vehicle can comprise a control apparatus for the longitudinal and/or lateral guidance of the vehicle in accordance with any of the previously mentioned aspects.

The above-described preferred embodiments and features of the invention may be combined with one another in any desired manner. Further details and advantages of the invention will be described below with reference to the appended drawings. In the drawings.

Figure 1:
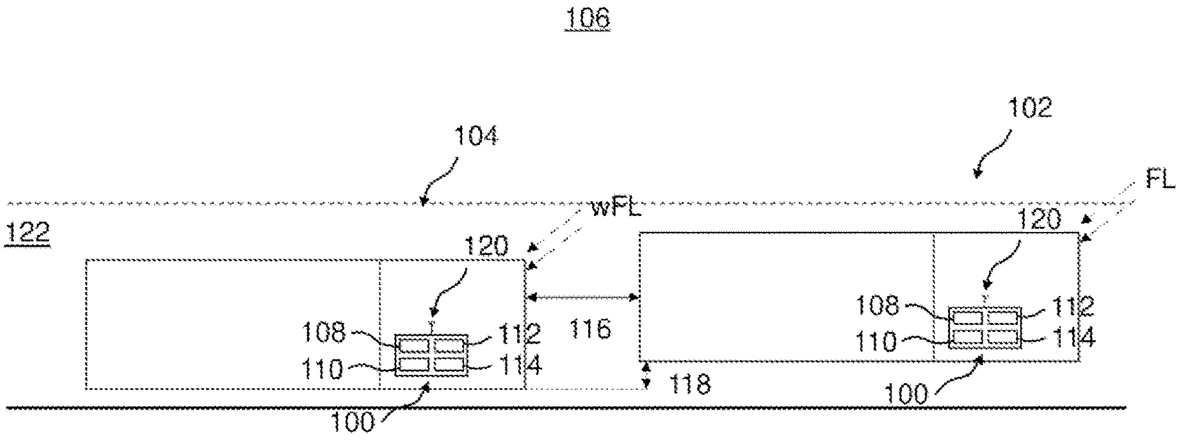
FIG. 1 shows a schematic illustration of an exemplary vehicle group with two vehicles, of which at least one comprises an exemplary embodiment of the control apparatus.

FIG. 1 shows a first exemplary embodiment of a control apparatus, which is generally denoted by the reference sign 100. FIG. 1 schematically shows a vehicle group 106, which is formed from a vehicle 102 and at least one further vehicle 104. The at least one further vehicle 104 is arranged so as to follow the vehicle 102 in each case with a longitudinal distance 116 and a lateral distance 118.

The vehicle 102 and the at least one further vehicle 104 each have the control apparatus 100. Alternatively, only one of the vehicles in the vehicle group may comprise an exemplary embodiment of the control apparatus 100. The respective control apparatus 100 comprises here a determination unit 108, a control unit 110, a memory unit 112, and a computational unit 114, and also a communication device 120. The communication device 120 enables communication of the control apparatus 100 of the vehicle 102 with the control apparatus 100 of the at least one further vehicle 104.

Furthermore, a vehicle air resistance, FL, acts on the vehicle 102 and a further vehicle air resistance, wFL, acts on the vehicle 104, with the air resistances acting counter to the operation (i.e. the driving operation) of the vehicle 102 and of the at least one further vehicle 104.

A radio modem, an antenna amplifier, and an antenna can be connected to the communication device 120, for example in accordance with radio access technology of the 3GPP, in particular in accordance with "Long-Term Evolution" (LTE) or "New Radio" (NR). The radio communication via the communication device 120 can be a direct radio link from vehicle to vehicle (vehicle-to-vehicle or V2V), optionally with a control channel to a base station, in particular in accordance with 3GPP Licensed-Assisted Access (LAA).

The control apparatus 100 of the vehicle 102 furthermore communicates with the communication device 120 of the vehicle 102 for the exchange of signals and is configured to communicate signals for the longitudinal and/or lateral guidance from the vehicle 102 to a further vehicle, for example the at least one further vehicle 104, during operation of a vehicle group 106. The control apparatus 100 of the at least one further vehicle 104 alternatively communicates with the communication device 120 of at least one further vehicle 104 for the exchange of signals and is configured to communicate signals for the longitudinal and/or lateral guidance from the at least one further vehicle 104 to a further vehicle, for example the vehicle 102, during operation of a vehicle group 106.

The vehicle group 106 is moved in a longitudinal and/or lateral guidance operation on a roadway 122 by means of the control apparatus 100 of the vehicle 102 or of the at least one further vehicle 104, and the longitudinal distance 116 and/or the lateral distance 118 are controlled by the control unit 110.

Figure 2:
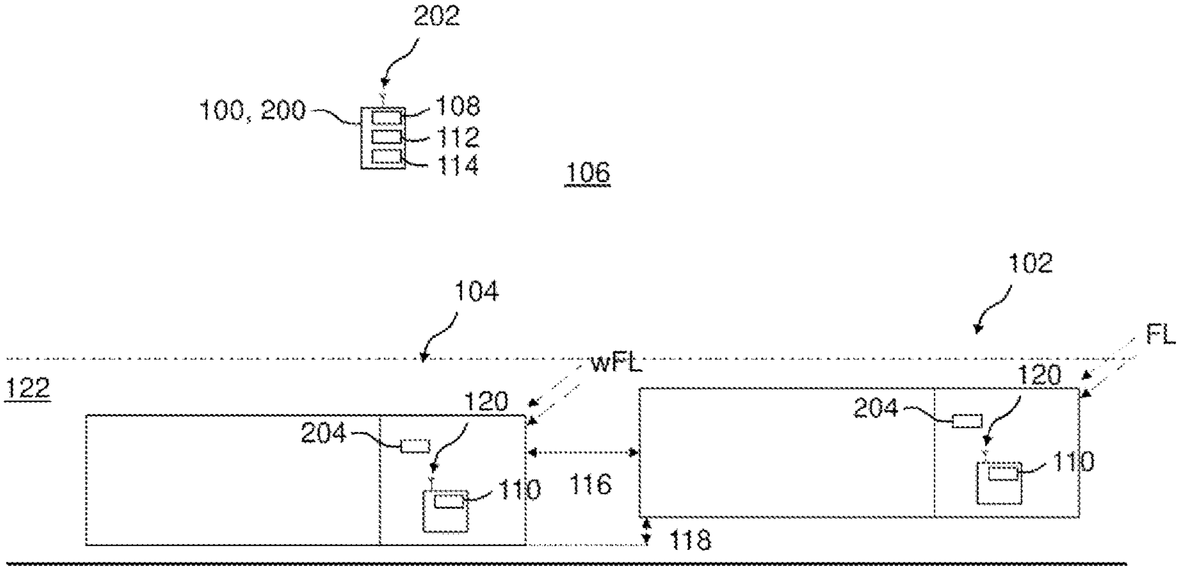
FIG. 2 shows a schematic illustration of an exemplary vehicle group with two vehicles and of a control apparatus outside the vehicles for controlling the two vehicles.

FIG. 2 shows a further exemplary embodiment of a control apparatus 100, which is generally denoted by the reference sign 100. FIG. 1 schematically shows a vehicle group 106, which is formed from a vehicle 102 and at least one further vehicle 104. The at least one further vehicle 104 is arranged so as to follow the vehicle 102 in each case with a longitudinal distance 116 and a lateral distance 118.

The vehicle 102 and the at least one further vehicle 104 each have a control unit 110, a communication device 120, and a sensor 204. The control unit 110 of the vehicle 102 and of the at least one further vehicle 104 is configured here to carry out a longitudinal and/or lateral guidance operation of the vehicle group 106.

Furthermore, a vehicle air resistance, FL, acts on the vehicle 102 and a further vehicle air resistance, wFL, acts on the vehicle 104, with the air resistances acting counter to the operation (i.e. the driving operation) of the vehicle 102 and of the at least one further vehicle 104.

The control unit 110 and/or the sensor 204 of the vehicle 102 and of the at least one further vehicle 104 communicate with the respective communication devices 120 for the exchange of signals and are configured to communicate, by means of the respective communication devices 120, with a data communication device 202 of a data processing apparatus 200, which is in the form of the control apparatus 100, outside the vehicle group 106.

The data processing apparatus 200 comprises in each case a determination unit 108, a control unit 110, and a computational unit 114 and is configured to store control variables of the vehicle 102 and/or of the at least one further vehicle 104 in a characteristic map and to determine and/or to vary the FL and the wFL. The data processing apparatus 200 can for this purpose utilize, among other things, a neural network and/or algorithms of artificial intelligence or machine learning.

The vehicle group 106 is moved in a longitudinal and/or lateral guidance operation on a roadway 122 by means of the data processing apparatus 200, and the longitudinal distance 116 and/or the lateral distance 118 are controlled by the data processing apparatus 200. Alternatively, the data processing apparatus 200 can be configured to control the vehicle group in a closed loop or to control the longitudinal distance 116 and/or the lateral distance 118 of the vehicle 102 relative to the at least one further vehicle 104 in a closed loop.

Figure 3:
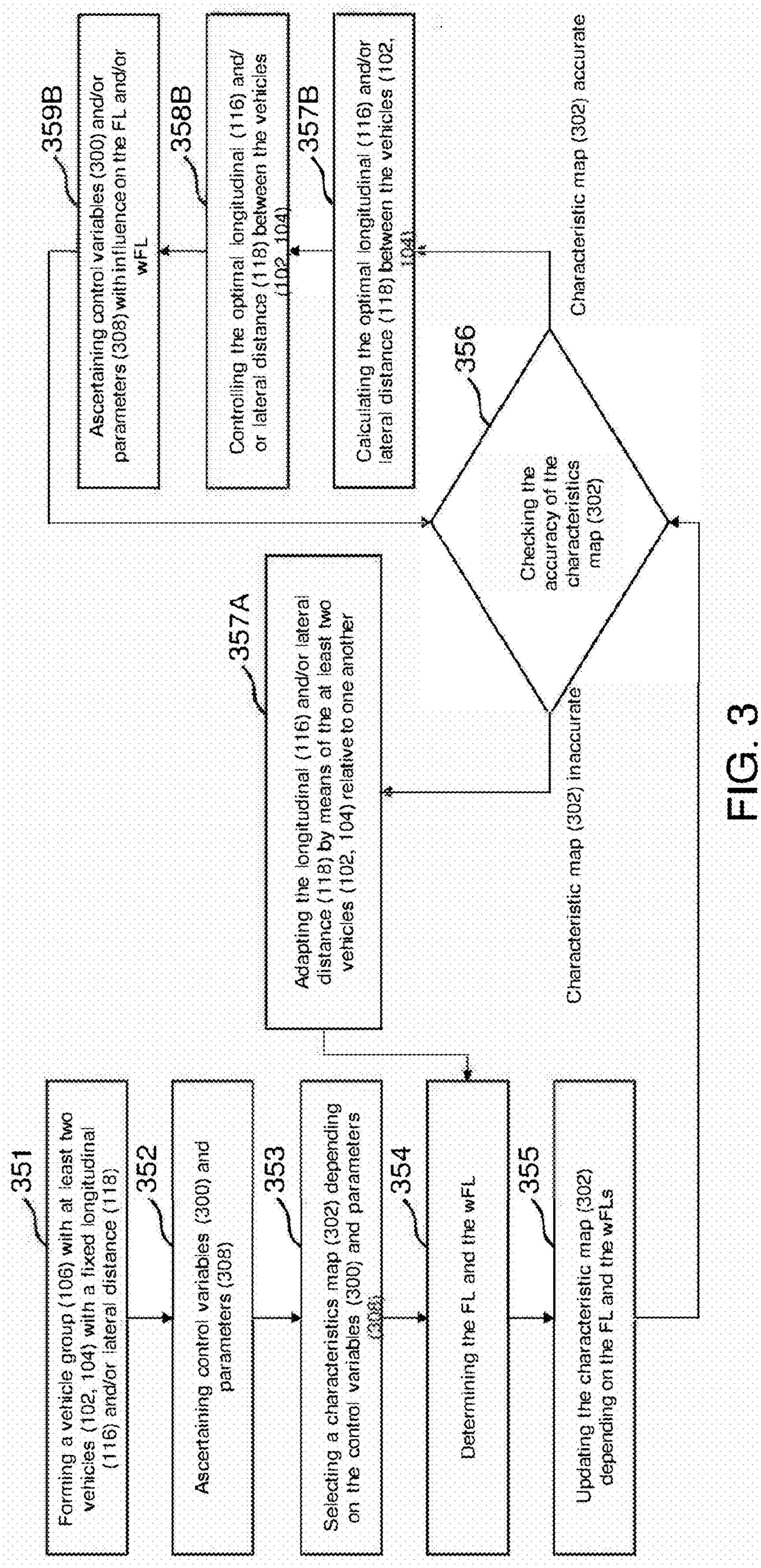
FIG. 3 shows a flowchart of an example of the operation of the control apparatus according to the invention.

FIG. 3 shows an exemplary flow of the operation of the control apparatus according to the invention in a vehicle group 106 for controlling an energetically optimal operation of the vehicle group 106, having the following steps.

In a first step 351, the vehicle group 106 is formed from at least one vehicle 102 and at least one further vehicle 104. The vehicle 102 is arranged here by means of a stipulated longitudinal distance 116 and a stipulated lateral distance 118.

In a second step 352, at least one control variable 300 and/or at least one parameter 308 are determined, which influences a vehicle air resistance, FL, of the vehicle 102 and/or a further vehicle air resistance, wFL, of the at least one further vehicle 104. Existing sensors 204 of the vehicle 102 and/or of the at least one further vehicle 104 can be used here and/or further sensors can be arranged on the vehicle 102 and/or the at least one further vehicle 104.

In a third step 353, a characteristic map 302 is selected on the basis of the at least one control variable 300 and/or the at least one parameter 308, wherein the characteristic map 302 describes the dependence of the FL and/or of the wFL in relation to the at least one control variable 300 and/or the at least one parameter 308.

In a fourth step 354, the FL and/or the wFL is determined on the basis of the at least one control variable 300 and/or the at least one parameter 308.

In a fifth step 355, the characteristic map 302 is updated on the basis of the FL and wFL determined in the fourth step 354; for example, the FL and/or the wFL can be stored in the characteristic map 302 by means of a memory unit 112. In this case, at least one optimized control variable 304 is derived from the characteristic map.

In a sixth step 356, the accuracy of the characteristic map 302 or of the FL and/or of the wFL in relation to the at least one control variable 300 is checked, wherein the at least one control variable 300 is configured for example to control the longitudinal distance 116 and/or the lateral distance 118 of the vehicle 102 in relation to the at least one further vehicle 104. In this case, the deviation of the current longitudinal distance 116 and/or of the current lateral distance 118 in relation to the at least one control variable 300 is calculated and compared by means of a threshold value 306, wherein a branch A of the exemplary flow is adopted if the value falls below the threshold value and a branch B is adopted if the threshold value is exceeded.

If an inaccurate characteristic map is determined, the arrangement or order of the vehicle 102 in relation to the at least one further vehicle 104 is adapted in a further step 357A with respect to, for example, the longitudinal distance 116, the lateral distance 118, a movement speed, a driving level and/or an aerodynamic element by varying the influenceable variables. Subsequently, a return is made to the fourth step 354.

If an accurate characteristic map is determined, an attempt is made in a further first step 357B to calculate at least one energetically optimized control variable 304 for the longitudinal distance 116 and/or the lateral distance 118, wherein the at least one energetically optimized control variable 304 for arranging the vehicle 102 in relation to the at least one further vehicle 104 is configured such that an average from FL and wFL is reduced, preferably minimized.

In a further second step 358B, the longitudinal distance 116 and/or the lateral distance 118 of the vehicle 102 in relation to the at least one further vehicle 104 is adapted on the basis of the at least one energetically optimized control variable 304.

In a further third step 359B, the control variable 300 and/or at least one parameter 308 is determined and stored in the characteristic map 300. Subsequently, a return is made to the sixth step 356.

Alternatively, the exemplary flow for operating the control apparatus according to the invention in a vehicle group 106 for controlling an energetically optimal operation of the vehicle group 106 can be described as follows.

First, a vehicle group 106 is formed from at least two vehicles 102, 104. Fixed, initial vehicle distances comprising a longitudinal distance 116 and a lateral distance 118 are set in the process. Next, non-influenceable variables that have an influence on a vehicle air resistance, FL, of the vehicle 102 and/or on a further vehicle air resistance, wFL, of the at least one further vehicle 104 are determined.

Non-influenceable variables comprise, for example, the arrangement or order of the two vehicles 102, 104, a different vehicle geometry of the two vehicles 102, 104, wherein the make-up of the vehicle group 106 can change during the journey, wherein changing can include one of the two vehicles 102, 104 leaving and/or a further vehicle joining the vehicle group 106. Non-influenceable variables furthermore comprise environment conditions such as upward or downward gradient of the roadway 122, curve radii, wind speed or wind direction. Data relating to the wind speed or wind direction from external sources, such as the data processing apparatus 200 or further network-capable sources, or existing and/or arranged sources, such as for example sensors 204, can in this case be used.

The characteristic map 302 can be formed from the non-influenceable variables and influenceable variables (in particular the vehicle distances), which have an influence on the FL and/or the wFL. For this purpose, in the next step, an already stored characteristic map 302 is selected, which best maps the FL and/or the wFL in dependence on the current influenceable and non-influenceable variables. Such a characteristic map 302 can be stored in the vehicle 102, 104 or on the data processing apparatus 200, such as for example a server or a cloud, outside the vehicle.

The influenceable variables can comprise in each case vehicle distances, such as the longitudinal distance 116 and the lateral distance 118, and the speed of the vehicle group 106 and/or of the individual vehicles 102, 104, and further variables such as a driving level of the vehicles 102, 104 within the vehicle group 106 or active elements, or elements which are adjustable during the journey, for example aerodynamic elements such as roof spoilers.

After a first characteristic map 302 is selected, the current FL and/or wFL of the vehicles 102, 104 is calculated and the existing characteristic map 302 is updated therewith. This procedure is repeated until the characteristic map 302 is determined with sufficient accuracy. A characteristic map 302 is for example deemed to be determined with sufficient accuracy if, after a specific number of characteristic map updates, no more significant changes in the characteristic map 302 occur. Before the FL and/or the wFL is calculated again to update the characteristic map 302, a targeted and automatic variation of the actively influenceable variables takes place in each case. Rather than the characteristic map 302 described in the figure, the relationship between the air resistances of the individual vehicles and the influenceable or non-influenceable variables can also be illustrated, for example, with polynomial functions or neural networks.

As soon as the characteristic map 302 is sufficiently accurate, the energetically optimal vehicle distances, such as the longitudinal distance 116 and/or the lateral distance 118, and further actively influenceable variables are determined and set in the vehicle group 106. Subsequently, the non-influenceable variables are determined continuously, and the optimal vehicle distances, such as the longitudinal distance 116 and/or the lateral distance 118, are set on that basis in accordance with the current characteristic map 302.

The ascertainment of the FL and/or of the wFL during the journey makes it possible, as part of the energy-efficient control of the vehicle group 102, to react to changes in non-actively influenceable variables.

The control apparatus 100 can proceed by means of the following steps to determine the FL and/or the wFL. In a first step, a current drive power of one of the two and/or of the two vehicles 102, 104 is ascertained from current vehicle data, such as fuel consumption, motor rotation speed, motor torque, gear ratio, power loss characteristic maps of individual components such as transmission or differential, power requirement of auxiliary units or auxiliary users of the respective one of the two vehicles 102, 104. These vehicle data can in this case preferably be data that are available to the respective one of the two vehicles 102, 104 and are typically transmitted via a CAN bus. Alternatively, data such as unladen weight of the vehicle and loaded mass, estimated total vehicle mass or rotational inertias of the respective one of the two vehicles 102, 104 can be used for determining the drive power. In a second step, the rolling resistance of one of the two and/or of the two vehicles 102, 104 is ascertained from the current vehicle mass, possibly the mass distribution of the respective one of the two vehicles 102, 104, and the rolling resistance coefficient of the tires. Alternatively, rather than using a constant rolling resistance coefficient, it is also possible to use a function which takes into account for example the current speed or the corresponding axial loads of the respective one of the two vehicles 102, 104 to ascertain the rolling resistance coefficient. In a third step, the acceleration resistance of one of the two and/or of the two vehicles 102, 104 is ascertained from the vehicle mass of the respective one of the two vehicles 102, 104, the current vehicle acceleration, and the current rotational mass supplement factor. In a fourth step, the gradient resistance of one of the two and/or of the two vehicles 102, 104 is determined from the vehicle mass of the respective one of the two vehicles 102, 104 and a current gradient of the roadway 122. In this case, for example, available road data of the respective one of the two vehicles 102, 104, from which the current gradient is obtained, can be used. In step five, the FL and/or the wFL is determined in accordance with the following equation.

air resistance=drive power−rolling resistance−acceleration resistance−gradient resistance The respective air resistance can be calculated either individually in each of the two vehicles 102, 104 or together in one of the two vehicles 102, 104. Calculation on a server or a cloud outside of the vehicles 102, 104, such as for example the data processing apparatus 200, is also conceivable. The same applies to the determination of the energetically optimal vehicle distances, which include the longitudinal distance 116 and the lateral distance 118. The two vehicles 102, 104 should consequently have a suitable communication device 120 to be able to exchange relevant information, such as the control variable 300 and/or the optimized control variable 304. The amount and type of the information that must be exchanged is greatly dependent on where the individual calculations regarding the FL and/or the wFL and the energetically optimal vehicle distances take place. Relevant information can be all the actively or non-actively influenceable variables with influence on the FL and/or the wFL that have been mentioned above and all the data necessary to calculate the air resistances.

Alternatively, the vehicle group 106 can have vehicles that are not configured and/or suitable for operating the control apparatus 100 according to the invention. In that case, not suitable can comprise the absence of vehicle data, sensors or communication features. Furthermore, the vehicle group 106 can have vehicles that adapt their longitudinal and/or lateral guidance not according to the stipulations from the control apparatus 100 according to the invention, but for example on the basis of other energy-efficient driving strategies internal to the vehicle. The control apparatus 100 according to the invention can in this case be configured to control only individual vehicles 102, 104 of the vehicle group 106. Alternatively, it is conceivable that a vehicle 102, 104 adapts only the longitudinal distance 116 and/or the lateral distance 118 in relation to a vehicle driving ahead based on the FL and/or the wFL. As part of this alternative, receiving data for the longitudinal and/or lateral guidance of the non-controllable vehicles is expedient, wherein these data include for example information relating to the planned speed trajectory of the non-controllable vehicles.

Even though the invention has been described with reference to exemplary embodiments, it is evident to a person skilled in the art that various changes may be made and equivalents can be used as replacements. Furthermore, many modifications can be made in order to adapt a specific application of the internal combustion engine or a specific material to the teaching of the invention. Consequently, the invention is not restricted to the disclosed exemplary embodiments, but rather encompasses all exemplary embodiments that fall within the scope of the appended patent claims.

LIST OF REFERENCE SIGNS

100 Control apparatus
102 Vehicle
104 Further vehicle
106 Vehicle group
108 Determination unit
110 Control unit
112 Memory unit
114 Computational unit
116 Longitudinal distance
118 Lateral distance
120 Communication device
122 Roadway
200 Data processing apparatus
202 Data communication device
204 Sensor
300 Control variable
302 Characteristic map
304 Optimized control variable
306 Threshold value
308 Parameter
351 Forming the vehicle group
352 Ascertaining the influence variables on the FL and wFL
353 Selecting a characteristic map
354 Determining the air resistances
355 Adapting the characteristic map
356 Checking the characteristic map
367A Varying the vehicle distances
367B Determining optimal vehicle distances
368B Controlling the optimal vehicle distances
369B Ascertaining the influence variables on the FL and wFL

The invention claimed is:

1. A control apparatus for the longitudinal and/or lateral guidance of a vehicle relative to at least one further vehicle in a vehicle group, comprising:

a determination unit, which is configured to determine a vehicle air resistance, FL, of the vehicle and a further vehicle air resistance, wFL, of the at least one further vehicle;

a control unit, which is configured to control a control variable of the longitudinal or lateral guidance of the vehicle or of the at least one further vehicle in the vehicle group;

a memory unit, which is configured to store the determined FL and wFL in association with the controlled control variable in a characteristic map, wherein the control unit is configured to vary the control variable, the determination unit is configured to determine the FL and the wFL in the state of the varied control variable, and the memory unit is configured to store the FL and wFL determined in the state of the varied control variable in the characteristic map in association with the varied control variable; and a computational unit, which is configured to calculate an optimized control variable optimizing the FL and the wFL on the basis of the stored characteristic map, wherein the control unit is further configured to control the control variable of the longitudinal or lateral guidance of the vehicle or of the at least one further vehicle in the vehicle group in accordance with the optimized control variable, wherein the optimized control variable calculated by the computational unit is configured to orient the vehicle by means of the longitudinal or lateral guidance in relation to the at least one further vehicle to minimize an average formed from the FL and the wFL.

2. The control apparatus as claimed in claim 1, wherein the determination unit measures the FL or the wFL, or calculates the FL or the wFL on the basis of data from at least one sensor of the vehicle and/or of the at least one further vehicle.

3. The control apparatus as claimed in claim 1, wherein the control variable comprises at least a longitudinal distance of the vehicle or of the at least one further vehicle in relation to one another, or a lateral offset of the vehicle or of the at least one further vehicle in relation to one another, or a vehicle speed of the vehicle or of the at least one further vehicle, or a driving level of the vehicle or of the at least one further vehicle, or a setting of an aerodynamic element of the vehicle or of the at least one further vehicle.

4. The control apparatus as claimed in claim 1, wherein the memory unit is further configured to calculate a deviation between the determined FL and wFL and the FL and wFL stored in the characteristic map in association with the varied control variable, wherein the computational unit calculates the optimized control variable if the deviation is less than a threshold value.

5. The control apparatus as claimed in claim 1, wherein the memory unit is further configured to calculate a deviation between the determined FL and wFL and the FL and wFL stored in the characteristic map in association with the varied control variable, wherein the control unit is configured to continue the variation of the control variable if the deviation is greater than or equal to a threshold value.

6. The control apparatus as claimed in claim 1, wherein the control apparatus further comprises a communication device, which is configured to transmit the control variable or the optimized control variable to the further vehicle in the vehicle group and/or to receive the wFL from the further vehicle in the vehicle group, wherein the control apparatus is implemented in the vehicle in the vehicle group; or to transmit the control variable or the optimized control variable from a data processing apparatus outside the vehicle group to the vehicle and the further vehicle in the vehicle group or to receive the FL from the vehicle and the wFL from the further vehicle in the vehicle group, wherein the control apparatus is implemented in the data processing apparatus outside the vehicle group.

7. The control apparatus as claimed in claim 1, wherein the memory unit comprises a neural network representing the characteristic map and the computational unit is configured to calculate the control variable optimizing the FL and the wFL by means of the neural network.

8. The control apparatus as claimed in claim 1, wherein the control apparatus is arranged outside of the vehicle or of the at least one further vehicle, wherein the control apparatus further comprises a data communication device, which is configured to receive data for determining the FL and the wFL, by means of which data the determination unit determines the FL and the wFL, wherein the control unit transmits the control variable by means of the data communication device for the longitudinal or lateral guidance of the vehicle or of the at least one further vehicle in the vehicle group to the vehicle or to the at least one further vehicle.

9. The control apparatus as claimed in claim 8, wherein the computational unit is implemented in a computational network or cloud server.

10. The control apparatus as claimed in claim 1, wherein the computational unit calculates the optimized control variable on the basis of the FL and of the wFL and a drive power of the vehicle and of the at least one further vehicle is minimized.

11. The control apparatus as claimed in claim 1, wherein the control unit is configured to control the control variable of the longitudinal or lateral guidance of the vehicle or of the at least one further vehicle in the vehicle group in a closed loop.

12. The control apparatus as claimed in claim 1, wherein the control apparatus is arranged in the vehicle or in the at least one further vehicle and is configured to control a plurality of vehicles or all vehicles of the vehicle group in an open or closed loop.

13. The control apparatus as claimed in claim 1, wherein the memory unit is configured to store the FL and wFL, determined in the state of the varied control variable, in the characteristic map in association with the varied control variable and at least one parameter, wherein the parameter influences the FL or the wFL without being controlled by the control unit.

14. The control apparatus as claimed in claim 13, wherein the at least one parameter is a wind speed or a vehicle geometry.

15. The control apparatus as claimed in claim 1, wherein the vehicle is a utility vehicle.

16. A vehicle configured for the longitudinal or lateral guidance in a vehicle group of two or more vehicles, wherein the vehicle comprises:

a control apparatus as claimed in claim 1 for the longitudinal or lateral guidance of the vehicle.

17. The vehilce of claim 16, wherein the vehicle is a utility vehicle.

* * * * *